United States Patent [19]
Day

[11] Patent Number: 5,838,329
[45] Date of Patent: Nov. 17, 1998

[54] FAST PERSPECTIVE TEXTURE MAPPING FOR 3-D COMPUTER GRAPHICS

[75] Inventor: Michael R. Day, London, England

[73] Assignee: Argonaut Technologies Limited, London, England

[21] Appl. No.: 702,462

[22] PCT Filed: Mar. 31, 1995

[86] PCT No.: PCT/GB95/00751

§ 371 Date: Dec. 26, 1996

§ 102(e) Date: Dec. 26, 1996

[87] PCT Pub. No.: WO95/27266

PCT Pub. Date: Oct. 12, 1995

[30] Foreign Application Priority Data

Mar. 31, 1994 [GB] United Kingdom .................... 9406515

[51] Int. Cl.$^6$ ....................................................... G06T 15/70
[52] U.S. Cl. ........................................... 345/426; 345/422
[58] Field of Search .................................. 345/426, 427, 345/429, 430, 422

[56] References Cited

U.S. PATENT DOCUMENTS

| | | | |
|---|---|---|---|
| 4,615,013 | 9/1986 | Yan et al. ................................. | 345/430 |
| 5,343,558 | 8/1994 | Akeley .................................... | 345/426 |
| 5,345,541 | 9/1994 | Kelley et al. ........................... | 345/426 |
| 5,469,535 | 11/1995 | Jarvis et al. ............................. | 345/430 |
| 5,649,082 | 7/1997 | Burns ...................................... | 345/430 |

OTHER PUBLICATIONS

IEEE Computer Graphics and Applications, vol. 6, No. 9, Sep. 1986, New York, NY pp. 40–53, XP 000004804, Bier and Sloan, *Two–Part Texture Mapping*.

EUROGRAPHICS, 2 Sep. 1991 — 6 Sep. 1991, Amsterdam, NL, pp. 385–396, XP000300282, Abi–Ezzi adn Shirman, *Tesselation of Curved Surfaces Under Highly Varying Transformations*.

*Primary Examiner*—Cliff N. Vo
*Attorney, Agent, or Firm*—DeWitt Ross & Stevens S.C.

[57] ABSTRACT

A method of processing computer graphics information for rendering an image on a display, comprising texture mapping of a pre-prepared texture map to flat surface of an object which is to be viewed in perspective on the display, wherein each surface to be texture mapped is scanned along notional lines of constant z (depth) coordinate (z-lines) to determine the end coordinates of those lines, to which the texture values of the pre-prepared texture map can be mapped without modification for perspective.

7 Claims, 1 Drawing Sheet

= POLYGON BOUNDARY

= Z-LINE PIXEL OUTSIDE BOUNDARY

= Z-LINE PIXEL INSIDE BOUNDARY

FAST PERSPECTIVE TEXTURE MAPPING FOR 3-D COMPUTER GRAPHICS

FIELD OF THE INVENTION

This invention relates to planar texture mapping for 3-D computer graphics.

BACKGROUND OF THE INVENTION

Planar texture mapping is the task of applying a prestored or generated image to the flat surface of a 3-D object when the object is viewed in perspective on a display. The projected images must be drawn in perspective. It is difficult to do this in real time, i.e. so that, animations appear to happen smoothly, particularly for computer games which often do not have sufficient computing power. Details of the subject can be found in "3-D Computer Animation" by Vince, Addison-Wesley (1992).

The techniques currently used can be divided into two categories: (a) those which explicitly calculate the texture coordinates for every pixel of the polygon to be rendered—this involves certain calculations to be performed at each pixel, in particular at least one divide operation; and (b) those which evaluate the texture coordinates only at the edges of each horizontal span of the polygon, and then use a linear interpolation scheme to approximate their values at the intermediate pixels (or some other form of approximation).

Techniques that fall into category (a) above give rise to much longer execution times than those in category (b), for all but the smallest of polygons to be rendered. This makes them unsuitable for real-time rendering systems unless dedicated rendering hardware is used.

On the other hand, the reduced running times of techniques in category (b) are offset by the loss of accuracy incurred in the texture projection. If polygons rendered using these techniques are viewed close up, distortion of the texture will be seen, to a degree which may be unacceptable.

SUMMARY OF THE INVENTION

The proposed solution is to scan convert the polygon not along horizontal scanlines but along carefully chosen angled lines, representing the lines of constant z-coordinate.

Accordingly, the invention proposes a method of rendering an image on a display, comprising texture mapping of a pre-prepared texture map to flat surfaces of an object which is to be viewed in perspective on the display, characterised by scanning each surface to be texture mapped along notional lines of constant z (depth) coordinate (z-lines); and for each line of constant z, determining the object end coordinates of the lines, determining the texture values for the end coordinates, determining the texture values for the coordinates between end coordinates by interpolation, and mapping the texture values of the pre-prepared texture map to each line of constant z and thereby without modification for perspective.

DESCRIPTION OF THE PREFERRED EMBODIMENTS

Figure 1:
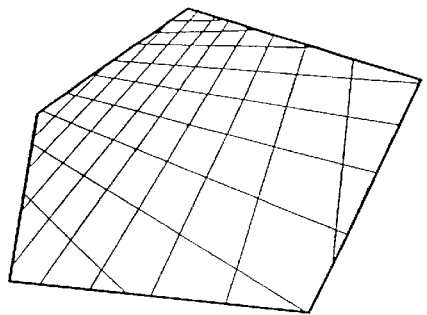
Figure 2:
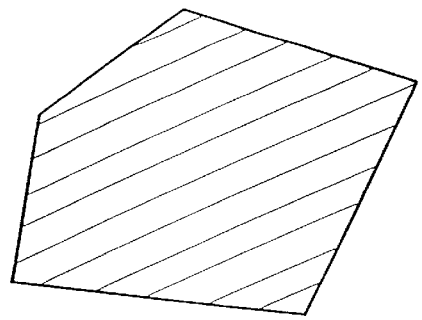
Figure 3:
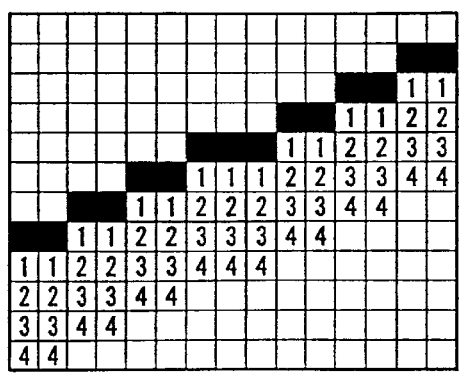
Figure 4:
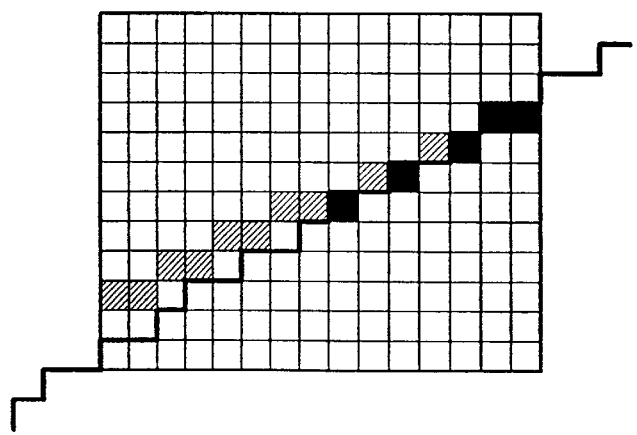
Figure 4:
Figure 4:
Figure 4:

To fully understand the invention, an example of the inventive technique will now be described with reference to the drawing.

FIG. T1 shows the outline of a planar polygon which is to be rendered with texture from a texture map whose uv-coordinate space is indicated by the gridlines. Consider a plane of constant z, with respect to the view space coordinates. Unless the plane of the polygon itself lies parallel to this plane, the two planes will intersect in a line of constant z. A set of such planes gives rise to a set of parallel lines, referred to here as z-lines.

Such a set of z-lines is shown for the example polygon, in FIG. T2. For texture which is mapped onto the polygon along a z-line, there is no perspective foreshortening as all the points have equal z-coordinate. The z-line can therefore be rendered using two DDAs, one to track the line in uv-space, and one to obtain the screen pixels it maps to. The only texture coordinates explicitly calculated for the z-line are those at its endpoints.

The method for rendering the whole polygon is therefore to drop the notion of horizontal scanlines, and instead to draw parallel to the z-lines. For a particular polygon, the gradient of the z-lines in view coordinates can be calculated from a knowledge of the polygon's plane equation and the geometry of the projection.

We must ensure that when drawing these angled lines, care is taken to write to each pixel of the polygon once and only once. A scheme that permits this is illustrated in FIG. T3. The pixels making up a representative z-line can be obtained by a standard Bresenham line draw. The remaining z-lines are generated by vertically translating the representative z-line by the appropriate number of pixels if the line is at less than 45 degrees to the horizontal, and horizontally translating it if the line is at 45 degrees or more.

Finally, the texture coordinates must be evaluated for the start and end of each z-line drawn to. This can either be done explicitly every time new coordinates are required, or by making use of the fact that the numerator and denominator of each of u and v are linear in both screen coordinates, and can therefore be maintained incrementally as scan conversion proceeds.

A problem is encountered when trying to render polygons in this way. For convex polygons rendered using a simple horizontal scan, each span consists of a contiguous block of pixels. This is not always the case for convex polygons rendered using a z-line scan. FIG. T4 shows the situation where a polygon edge and the z-lines have almost equal gradients—the set of pixels on a particular z-line which lie in the interior of the polygon forms a broken line. This is a result of interference between two integer approximation processes—one which generates the polygon edge, and one which generates the z-line. Two approaches may be taken:

(i) An approximation polygon outline can be obtained from the following observation:

If all pixel columns (rows) in the z-line pattern are shifted vertically (horizontally) so that the representative z-line becomes horizontal (vertical), then the original polygon outline is mapped to a new one which is simply a vertically (horizontally) sheared version of the original, albeit with artifacts introduced by the finite resolution. Scan conversion then proceeds by notionally rendering this new sheared polygon with ordinary horizontal (vertical) scanning, and performing the inverse shift on the pixel columns (rows) at the output stage. The result is only an approximation to the desired polygon because the inverse shift introduces the same type of artifact.

(ii) The exact polygon outline can be obtained as follows:

First a bit-per-pixel mask of the actual polygon is generated using a standard horizontal scan. The mask is then sheared vertically (horizontally) by performing column (row) shifts on the mask. The sheared mask is then used to control the output of texture along z-lines, by reading the mask in rows (columns). This produces the desired polygon at the expense of shearing and reading the bit-mask. In practice, however, it is not necessary to store the mask for the entire polygon. Assuming the z-lines lie at less than 45 degrees to the horizontal (the alternative case has a similar treatment) the scan conversion process, instead of generating the mask, is used to fill a set of buckets. Each bucket corresponds to a z-line, and contains the screen x-coordinates of all pixel columns for which the column goes from inside the polygon to out or vice versa, on that z-line. Thus a pair of entries is made for the top and bottom of the section of a pixel column that is covered by the polygon (there may be more than one pair for a concave outline). Having generated the array of buckets, the z-lines are rendered in top-to-bottom order making use of a mask which has one bit for each pixel in a z-line. It is initially zeroed, and then updated incrementally before each z-line is rendered. For each bucket entry at a given z-line, the corresponding bit in the mask is toggled, to indicate that the pixel column has just crossed the polygon boundary on the current z-line.

If the exact polygon outline is generated using the bit-mask technique outlined in (ii) above, then the rendering part of the software is presumably capable of reading from a completely general mask, and there is no reason why we must restrict ourselves to (convex) polygons. Thus any planar shape can be texture mapped, such as concave polygons, disks, planar regions bounded by 2D splines, etc. provided a bit-mask can be generated of the projected interior.

The solution given here combines the advantages of both the categories of technique listed in the introduction, in that it produces an accurate perspective projection of the texture, while at the same time using a linear interpolation scheme to rapidly calculate texture coordinates for interior pixels of the polygon, calculating them explicitly only on the polygon boundary.

The method of scan conversion is more complicated than a standard horizontal scan. On the whole therefore, more work is required per boundary pixel. The technique will be faster than category (a) mentioned at the start only for polygons with an interior to boundary ratio higher than a certain value.

I claim:

1. A method of rendering an image on a display, comprising texture mapping of a pre-prepared texture map to flat surfaces of an object which is to be viewed in perspective on the display, characterised by scanning each surface to be texture mapped along notional lines of constant z (depth) coordinate (z-lines); and for each line of constant z, determining the object end coordinates of the lines, determining the texture values for the end coordinates, determining the texture values for the coordinates between end coordinates by interpolation, and mapping the texture values of the pre-prepared texture map to each line of constant z and thereby without modification for perspective.

2. A method as claimed in claim 1 wherein the pixels of a representative z-line are obtained by a Bresenham line-draw.

3. A method as claimed in claim 1 wherein after obtaining pixel-coordinates of a representative z-line, the remaining z-lines are obtained by vertically translating the representative z-line by the appropriate number of pixels if the line is at less than 45 degrees to the horizontal, and horizontally translating it if the line is at 45 degrees or more.

4. A method as claimed in claim 1 wherein for objects in which the numerator and denominator of the u and v of the (u,v) texture map are linear in both screen coordinates, the end (u,v) coordinates of the texture map line to be mapped to the object surface are explicitly calculated only once and are thereafter maintained by incremental change for succeeding scans.

5. A method as claimed in claim 2 wherein after obtaining pixel-coordinates of a representative z-line, the remaining z-lines are obtained by vertically translating the representative z-line by the appropriate number of pixels if the line is at less than 45 degrees to the horizontal, and horizontally translating it if the line is at 45 degrees or more.

6. A method as claimed in claim 2 wherein for objects in which the numerator and denominator of the u and v of the (u,v) texture map are linear in both screen coordinates, the (u,v) coordinates of the texture map line to be mapped to the object surface are explicitly calculated only once and are thereafter maintained by incremental change for succeeding scans.

7. A method as claimed in claim 3 wherein for objects in which the numerator and denominator of the u and v of the (u,v) texture map are linear in both screen coordinates, the (u,v) coordinates of the texture map line to be mapped to the object surface are explicitly calculated only once and are thereafter maintained by incremental change for succeeding scans.

* * * * *